United States Patent Office 3,709,839
Patented Jan. 9, 1973

3,709,839
FIBER-FORMING COMPOSITIONS HAVING IMPROVED DYE RECEPTIVITY, PROCESS FOR THEIR PREPARATION AND NEW BASIC NITROGEN COMPOUNDS EMPLOYED THEREIN
Vittorio Cappuccio, Cornelio Caldo, and Giuseppe Cantatore, Terni, Italy, assignors to Montecatini Edison S.p.A., Milan, Italy
No Drawing. Application May 24, 1967, Ser. No. 640,808, now Patent No. 3,527,846, dated Sept. 8, 1970, which is a continuation-in-part of application Ser. No. 124,346, July 17, 1961. Divided and this application Mar. 31, 1970, Ser. No. 24,346
Claims priority, application Italy, July 20, 1960, 12,800/60; Mar. 3, 1961, 3,985/61; May 24, 1961, 13,357/61
Int. Cl. C08f 29/12; C08g 23/12
U.S. Cl. 260—2 BP                                  4 Claims

---

ABSTRACT OF THE DISCLOSURE

Fiber-forming compositions having improved dye receptivity comprise a polymer selected from the group consisting of polyalphamonoolefins and polyacrylonitrile and from about 1 to 25% by weight, based on the weight of the polymer, of a basic nitrogen-containing compound, said compound having been obtained by either (A) reacting epichlorohydrin with:

($A_1$) two disecondary $C_4$–$C_{60}$ aliphatic, aromatic or heterocyclic diamines selected from the group consisting of diamines containing secondary amine groups and diamines containing primary amine groups which act as secondary amine groups due to steric hindrance, or ($A_2$) one disecondary diamine according to ($A_1$) and one $C_3$–$C_{30}$ primary aliphatic amine, or (B) reacting epichlorohydrin with a disecondary aliphatic, aromatic or heterocyclic $C_4$–$C_{60}$ diamine or a diamine containing primary amine groups which act as secondary amine groups due to steric hindrance.

Basic nitrogen-containing compounds obtained by either of the foregoing reactions (A) and (B).

---

CROSS-REFERENCE TO RELATED APPLICATIONS

This application is a divisional of copending application Ser. No. 640,808, filed May 24, 1967, now Pat. No. 3,527,846, now U.S. Pat. No. 3,527,846, issued Sept. 8, 1970, which application is in turn a continuation-in-part of application Ser. No. 124,346, filed July 17, 1961, now abandoned.

BACKGROUND OF THE INVENTION (1) Field of the invention

The present invention relates to improvements in the preparation of textile fibers obtained from polymers such as polyolefins and acrylonitrile polymers. More particularly, the present invention relates to the preparation of nitrogen compounds which, when added to the above polymers, make possible the production of fibers which are receptive to dyes.

(2) Description of the prior art

Previously, methods for preparing textile fibers possessing a considerable receptivity to acid dyes have been proposed. These methods generally comprise extruding mixes of olefin or acrylonitrile polymers with basic nitrogen compounds obtained by the condensation of epichlorohydrin with diamines, followed by alkylation with alkyl halides.

The use of polyfunctional amines in these methods leads, in some cases, to the partial formation of branched or cross-linked structures which can cause some difficulties in the extrusion of the mixes since, by increasing the degree of branching and cross-linking, the fusibility of the condensates is generally decreased. The branching and cross-linking also very often causes the undesired phenomena of thermal decomposition.

SUMMARY OF THE INVENTION

We have now found that improved fibers having increased dye deceptivity, especially for acid dyes, are obtained from alphamonoolefin or acrylonitrile polymers having admixed therewith certain improved basic nitrogen condensation products which do not possess the drawbacks of the condensates heretofore employed.

More particularly, the present invention provides dye receptive fibers prepared from a composition comprising a polymer selected from the group consisting of polyalphamonoolefins and polyacrylonitrile and from about 1 to 25% by weight, based on the weight of the polymer, of a basic nitrogen-containing compound, this compound having been obtained by either (A) reacting epichlorohydrin with:

($A_1$) two disecondary $C_4$–$C_{60}$ aliphatic, aromatic or heterocyclic amines selected from the group consisting of diamines containing secondary amine groups and diamines containing primary amine groups which act as secondary amine groups due to steric hindrance, or ($A_2$) one disecondary amine according to ($A_1$) and one $C_3$–$C_{30}$ primary aliphatic amine, or (B) reacting epichlorohydrin with a disecondary aliphatic, aromatic or heterocyclic $C_4$–$C_{60}$ amine or a diamine containing primary amine groups which act as secondary amine groups due to steric hindrance.

The invention also provides a process for preparing dye receptive fibers which process comprises melting the foregoing composition and subjecting it to molten mass extrusion and drawing.

Also provided by the present invention are the basic nitrogen-containing compounds employed in the foregoing compositions, these compounds being obtained by either (A) reacting epichlorohydrin with:

($A_1$) two disecondary $C_4$–$C_{60}$ aliphatic, aromatic or heterocyclic amines selected from the group consisting of diamines containing secondary amine groups and diamines containing primary amine groups which act as secondary amine groups due to steric hindrance, or ($A_2$) one disecondary amine according to ($A_1$) and one $C_3$–$C_{30}$ primary aliphatic amine, or (B) reacting epichlorohydrin with a disecondary aliphatic, aromatic or heterocyclic $C_4$–$C_{60}$ amine or a diamine containing primary amine groups which act as secondary amine groups due to steric hindrance.

DESCRIPTION OF THE PREFERRED EMBODIMENTS

According to one feature of the invention, the basic nitrogen condensation products of the present invention may be obtained by condensing, either in the presence or absence of solvents or condensing agents, one or more primary amines (n-dodecylamine, n-hexadecylamine, n-octadecylamine and the like) having 3 to 30 carbon atoms with epichlorohydrin. This first condensation is then followed by a further reaction with a $C_4$–$C_{60}$ disecondary aromatic, aliphatic or heterocyclic diamine, such as piperazine;
2-methylpiperazine;
2,5-dimethylpiperazine;
4,4'-dipiperidyl;
N,N'-dimethylethylenediamine;

N,N'-diethylethylenediamine;
N,N'-diisopropylethylenediamine;
N,N'-di-n-butylethylenediamine;
N,N'-dicyclohexylethylenediamine;
N,N'-di-n-dodecylethylenediamine;
N,N'-dimethyltrimethylenediamine;
N,N'-diisopropylhexamethylenediamine;
N,N'-di-n-butyl-hexamethylenediamine;
N,N'-di-2-butylhexamethylene diamine;
N,N'-diisobutylhexamethylenediamine;
N,N'-dicyclohexylhexamethylenediamine;
1,3-bis(n-dodecylamine)-propanol-2;
4,4'-bis(methylamine)diphenylmethane;
4,4'-bis(ethylamine)3,3'-dimethyl-diphenylmethane;
1,8-p-menthanediamine and the like.

Suitable condensing agents are the hydroxides or carbonates of an alkali metal. Suitable reaction solvents are aliphatic alcohols such as methanol, ethanol, isopropanol, n-butanol and the like. After the epichlorohydrin-amine condensate has been prepared, the disecondary diamine may be added, together with a further amount of epichlorohydrin, if desired.

Equivalent results are achieved in accordance with an alternative feature of the invention by directly reacting epichlorohydrin with one or more of the abovementioned diamines containing from 40 to 60 carbon atoms and having secondary amine groups or primary amine groups which act as secondary amine groups due to steric hindrance, such as in the case of $NH_2$ groups bound to tertiary carbon atoms in 1,8-p-menthanediamine.

The fibers are prepared by extruding mixes of polyolefins or polyacrylonitriles containing 1 to 25% by weight of the polymer of the nitrogen condensate prepared according to the present invention.

If desired, 0.1 to 5% of a solid dispersing agent for dispersing the nitrogen condensate in the molten mass may be used. Suitable dispersing agents include: cetyl and stearyl alcohols, stearic and palmitic acids, mono- di- or tristearic esters of glycerol, monoethanolamine stearate, $C_{12}$–$C_{30}$ aliphatic amines such as stearyl amine, condensation products of ethylene oxide with alcohols, amines or phenols, polystearamide, polystyrene, styrene copolymers, terpene polymers, etc.

The fibers obtained by extrusion of the mixes in accordance with the invention can be mono- or multi-filaments and can be employed for preparing continuous fibers and staples or for preparing bulky yarns and staples.

The mono- or multi-filaments of the present invention can suitably be subjected to treatments for the water-insolubilization of the basic nitrogen compound. Particularly useful for this purpose are treatments with formaldehyde, diisocyanates, diepoxy compounds or cross-linking agents such as divinylbenzene or the like. These treatments may be carried out before or after the stretching operation.

The stretching is executed using ratios between 1:2 and 1:10, at temperatures between 80° C. and 150° C., in stretching devices heated with either hot air, steam or a similar fluid.

The fibers thus obtained are subjected to dyeing with acid dyes, or with plastosoluble dyes. These fibers also possess good affinity for vat dyes and—only for the acrylic modified fibers—also basic dyes.

It is to be noted that the basic condensates of the present invention can also suitably be used with the fibers obtained from polyacrylonitrile or from copolymers containing at least 85% of acrylonitrile and a second monomer selected from the group consisting of vinyl acetate, methylacrylate, methylmethacrylate and 2-ethylhexylacrylate.

The following examples are presented to further illustrate the invention and are not intended to limit its scope.

As is known to the art subsequent to the discoveries of Natta et al., and as will be seen from the heptane residue present in the polypropylene used in the following examples, the polypropylene used in the examples consists prevailingly (more than 50%) of isotactic macromolecules.

In the examples the dyeing was carried out for 1½ hours at the boiling point in baths contatining 2.5% of dye by weight of the fiber, with a fiber/bath ratio of 1:40.

The dyeing with acid and metallized dyes was carried out in the presence of 3% of ammonium acetate (by weight of the fiber) and 1% of a surface-active agent consisting of the condensation product of ethylene oxide and an alkyl phenol.

30 minutes after the beginning of boiling, 2% of glacial acetic acid, by weight of the fiber, was added in order to improve the exhaustion of the baths.

Dyeing with plastosoluble (dispersed) dyes was carried out in the presence of 2% of surface-active agent, by weight of the fiber.

The fibers, after dyeing, were rinsed with running water and possessed intense colors in all cases, i.e., with acid, metallized and plastosoluble dyes.

The color fastness to light, washing and rubbing was entirely satisfactory.

A further improvement in the dye fastness was obtained by subjecting the fibers (before dyeing) to a treatment with a 3% aqueous ethyleneglycol diglycidyl ether solution and then heating the fibers for 15 minutes at 110°–120° C.

Example 1

485.1 g. (1.8 mols) of n-octadecylamine, 333 g. (3.6 mols) of epichlorohydrin and 900 ml. of ethanol were introduced into a 6-liter 3-necked flask, provided with a stirrer, a thermometer, and a reflux condenser.

The mass was refluxed for 8 hours. It was cooled to 20° C., and 516.6 g. (6 mols) of anhydrous piperazine, 388.5 g. (4.2 mols) of epichlorohydrin and 900 ml. of ethanol were added.

The mixture was stirred at 30–40 C. for 1 hour and then refluxed for 15 hours.

During the last 5 hours of refluxing, 312 g. (7.8 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a solid material, pale-yellow colored, softening at 55–58° C., N=13.1%, inherent viscosity=0.26 (measured in 0.5% $CHCl_3$ solution, at 25° C.).

A mix was prepared from 1.030 kg. of the polycondensate prepared as described above and 19.570 kg. of polypropylene, obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device under the following conditions:

screw temperature: 240° C.
head of spinning device temperature: 230° C.
spinneret temperature: 220° C.
spinneret type: holes, 60; diameter, 0.8 mm.; length, 16 mm.
pressure: 45 kg./cm.$^2$
winding speed: 250 m./minute The fibers obtained, after drawing at 130° C. in a drawing device heated with steam, with a drawing ratio of 1:5.3, have the following properties:

tenacity (g./den.): 4.2
elongation (percent): 25

After drawing, the fibers were wetted with a 5% aqueous solution of ethyleneglycoldiglycidylether and then dried at 110° C. Colors of good intensity and fastness were obtained after dyeing these fibers with the following dyes:

Solid yellow 2G (C.I.: No. 18965) (acid dye)
Wool red B (C.I.: acid red 115) (acid dye)
Alizarine blue SE (C.I.: acid blue 43) (acid dye)
Acid black JVS (C.I.: acid black 1) (acid dye)
Lanasyn yellow GLN (C.I.: acid yellow 112) (metallized dye)
Lanasyn red 2GL (C.I.: acid red 216) (metallized dye)
Lanasyn brown 3RL (C.I.: acid brown 30) (metallized dye)
Setacyl yellow 3G (C.I.: disperse yellow 20) (disperse dye)
Cibacet scarlet BR (C.I.: disperse red 18) (disperse dye)
Brilliant setacyl blue BG (C.I.: disperse blue 3) (disperse dye)

Example 2

107.8 g. (0.4 mol) of n-octadecylamine, 74 g. (0.8 mol) of epichlorohydrin and 300 ml. of ethanol were introduced into a 2-liter 3-necked flask, provided with a stirrer, a thermometer, and a reflux condenser.

The mass was refluxed for 8 hours. It was cooled to 20° C., and 86.1 g. (1 mol) of anhydrous piperazine, 55.5 g. (0.6 mol) of epichlorohydrin and 200 ml. of ethanol were added.

The mixture was stirred at 30–40° C. for 1 hour and then refluxed for 14 hours.

During the last 4 hours of refluxing, 56 g. (1.4 mols) of sodium hydroxide were added in small portions.

After filtration, the solvent was distilled off.

The residue was completely dried by heating at 140–150° C., for 2 hours, under a residual pressure of 1–2 mm. Hg.

The polycondensate so obtained is solid material, pale-yellow colored, softening at 42–45° C, N=12.1%, inherent viscosity=0.25 (measured in 0.5% $CHCl_3$ solution at 25° C.).

A mix was prepared from 0.345 kg. of the polycondensate prepared as described above and 6.555 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 220° C.
spinneret temperature: 220° C.
spinneret type: holes, 60; diameter, 0.8 mm.; length, 16 mm.
pressure: 42 kg./cm.$^2$
winding speed: 250 m./minute The fibers obtained, after drawing at 130° C., in a drawing device heated with steam, with a drawing ratio of 1:5.3, have the following properties:

tenacity (g./den.): 4.5
elongation (percent): 22

After drawing, the fibers were wetted with a 5% aqueous solution of ethyleneglycoldiglycidylether and then dried at 110° C.

Colors having good intensity and fastness were obtained after dyeing these fibers with the dyes used in Example 1.

Example 3

539 g. (2 mols) of n-octadecylamine, 370 g. (4 mols) of epichlorohydrin and 1000 ml. of ethanol were introduced into a 6-liter 3-necked flask, provided with a stirrer, a thermometer, and a reflux condenser.

The mass was refluxed for 8 hours. It was cooled to 20° C., and 172.2 g. (2 mols) of anhydrous piperazine and 500 ml. of ethanol were added.

The mixture was stirred at 30–40° C., for 1 hour and then refluxed for 14 hours.

During the last 4 hours of refluxing, 160 g. (4 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a solid material, yellow colored, N=8.6%, inherent viscosity=0.23 (measured in 0.5% $CHCl_3$ solution at 25° C.).

A mix was prepared from 0.894 kg. of the polycondensate prepared as described above and 16.985 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 220° C.
spinneret type: holes, 60; diameter, 0.8 mm.; length, 16 mm.
pressure: 45 kg./cm.$^2$
winding speed: 250 m./minute The fibers obtained, after drawing at 130° C., in a drawing device heated with steam, with a drawing ratio of 1:5.3, have the following properties:

tenacity (g./den.): 4.03
elongation (percent): 25

After drawing, the fibers were wetted with a 5% aqueous solution of ethyleneglycoldiglycidylether and then dried at 110° C.

Colors having good intensity and fastness were obtained after dyeing these fibers with the dyes used in Example 1.

Example 4

12.6 g. (0.5 mol) of n-dodecylamine, 92.5 g. (1 mol) of epichlorohydrin and 250 ml. of ethanol were introduced into a 1-liter 3-necked flask, provided with a stirrer, a thermometer and a reflux condenser.

The mass was refluxed for 8 hours. It was cooled to 20° C., and 86.1 g. (1 mol) of anhydrous piperazine, 46.25 g. (0.5 mol) of epichlorohydrin and 150 ml. of ethanol were added.

The mixture was stirred at 30–40° C. for 1 hour and then refluxed for 14 hours.

During the last 4 hours of refluxing, 60 g. (1.5 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a solid resinous material, softening at 58–60°, N=15.6%, inherent viscosity=0.21 (measured in 0.5% $CHCl_3$ solution, at 25° C.).

A mix was prepared from 0.150 kg. of the polycondensate prepared as described above and 2.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 240° C.
head of spinning device temperature: 230° C.
spinneret temperature: 220° C.
spinneret type: holes, 60; diameter, 0.8 mm.; length, 16 mm.
pressure: 38 kg./cm.$^2$
winding speed: 250 m./minute The fibers obtained, after drawing at 130° C. in a drawing device heated with steam, with a drawing ratio of 1:5.3, have the following properties:

tenacity (g./den.): 3.98
elongation (percent): 22

Before drawing, the fibers were wetted with a 6% aqueous solution of ethyleneglycoldiglycidylether and then drawn.

Colors having good intensity and fastness were obtained after dyeing these fibers with the dyes used in Example 1.

Example 5

With the polycondensate obtained as described in Example 1, a mix was prepared from 1.000 kg. of the polycondensate and 9.000 kg. of polyacrylonitrile having a molecular weight of 71,500. This mix was dispersed in 32 kg. of dimethylformamide, at room temperature.

This dispersion was then transformed into a spinning solution by passing it through a dissolver of the heat-exchanger type kept at 100–120°, and then dry-spun.

The fibers thus obtained were drawn in a drawing device heated with steam at 150–160° C., with a drawing ratio of 1:5. They were then subjected to treatment in water at 100° C. (for the dimensional stabilization of the fibers), to mechanical crimping, vaporization at 105° C. for 1 hour in an autoclave, sizing, cutting and drying.

The fibers thus obtained have the following properties:

tenacity (g./den.): 3.7
elongation (percent): 26.2

Colors having good intensity and fastness were obtained after dyeing these fibers with the following dyes:

Solid yellow 2G (C.I.: No. 18965) (acid dye)
Wool red B (C.I.: acid red 1155) (acid dye)
Alizarine blue SE (C.I.: acid blue 43) (acid dye)
Acid black JVS (C.I.: acid black 1) (acid dye)
Lanasyn yellow GLN (C.I.: acid yellow 112) (metallized dye)
Lanasyn red 2 GL (C.I.: acid red 216) (metallized dye)
Lanasyn brown 3RL (C.I.: acid brown 30) (metallized dye)
Setacyl yellow 3G (C.I.: disperse yellow 20) (disperse dye)
Cibacet scarlet BR (C.I.: disperse red 18) (disperse dye)
Brilliant setacyl blue BG (C.I.: disperse blue 3) (disperse dye)
Malachite green crystals (C.I.: basic green 4) (basic dye)
Basic fuchsine (C.I.: basic violet 14) (basic dye)

Example 6

86.1 g. (1 mol) of anhydrous piperazine, 170 g. (1 mol) of 1,8-menthanediamine, 185 g. (2 mols) of epichlorohydrin and 600 ml. of isopropanol, were introduced into a 2-liter 3-necked flask, provided with a stirrer, a thermometer, and a reflux condenser.

The mixture was stirred at 50–60° C. for 1 hour and then refluxed for 10 hours.

During the last 5 hours of refluxing, 80 g. (2 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a solid material, softening at 78–80° C., N=14.9%, inherent viscosity= 0.15 (measured in 0.5% $CHCl_3$ solution, at 25° C.).

A mix was prepared from 0.300 kg. of the polycondensate prepared as described above and 5.700 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 240° C.
head of spinning device temperature: 230° C.
spinneret temperature: 230° C.
spinneret type: holes, 60; diameter, 0.8 mm.; length, 16 mm.
pressure: 52 kg./cm.$^2$
winding speed: 430 m./minute The fibers obtained, after drawing at 120° C. in a drawing device heated with steam, with a drawing ratio of 1:5.5, and after being subjected to a thermal treatment, under conditions of free shrinking (110° C. for 15 minutes) for improving the dimensional stability, have the following properties:

tenacity (g./den.): 5.1
elongation (percent): 23

The fibers were then crimped and cut into staple having a length of 90 mm.

Colors having good intensity and fastness were obtained after dyeing these fibers with the dyes used in Example 1.

Example 7

137.7 g. (1.6 mols) of anhydrous piperazine, 170.4 g. (0.4 mols) of 1,3-bis(n-dodecylamine)propanol-2, 185 g. (2 mols) of epichlorohydrin and 600 ml. of methanol were introduced into a 2-liter 3-necked flask, provided with a stirrer, a thermometer, and a reflux condenser.

The mixture was stirred at 50–60° C. for 1 hour and then refluxed for 14 hours.

During the last 4 hours of refluxing, 80 g. (2 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a soft waxy material, N=13.0%.

A mix was prepared from 0.300 kg. of the polycondensate prepared as described above and 5.700 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 230° C.
head of spinning device temperature: 230° C.
spinneret temperature: 230° C.
spinneret type: holes, 60; diameter, 0.8 mm.; length, 16 mm.
pressure: 47 kg./cm.$^2$
winding speed: 420 m./minute The fibers obtained, after drawing at 130° C. in a drawing device heated with steam, with a drawing ratio of 1:5.3, have the following properties:

tenacity (g./den.): 5.3
elongation (percent): 21.5

After drawing, the fibers were wetted with a 5% aqueous solution of ethyleneglycoldiglycidylether and then dried at 120° C.

Colors having good intensity and fastness were obtained after dyeing these fibers with the dyes used in Example 1.

Example 8

86.1 g. (1 mol) of anhydrous piperazine, 226 g. (1 mol) of 4,4'-bis(methylamino)diphenylmethane, 185 g. (2 mols) of epichlorohydrin and 600 ml. of isopropanol were introduced into a 2-liter 3-necked flask, provided with a stirrer, a thermometer, and a reflux condenser.

The mixture was stirred at 30–50° C. for 1 hour and then refluxed for 14 hours.

During the last 4 hours of refluxing, 80 g. (2 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a resinous material, softening at 105–110° C., N=12.9%.

A mix was prepared from 0.300 kg. of the polycondensate prepared as described above and 5.700 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 230° C.
spinneret type: holes, 60; diameter, 0.8 mm.; length, 16 mm.
pressure: 45 kg./cm.$^2$
winding speed: 410 m./minute The fibers obtained, after drawing at 130° C. in a drawing device heated with steam, with a drawing ratio of 1:5.3 and after being subjected to a thermal treatment, under conditions of free shrinking (110° C. for 15 minutes) for improving the dimensional stability, have the following properties:

tenacity (g./den.): 5.4
elongation (percent): 24

Colors having good intensity and fastness were obtained after dyeing these fibers with the dyes used in Example 1.

Example 9

103.3 g. (1.2 mols) of anhydrous piperazine, 182.4 g. (0.8 mol) of N,N'-dibutylhexamethylenediamine, 185 g. (2 mols) of epichlorohydrin and 300 ml. of methanol were introduced into a 2-liter 3-necked flasked, provided with a stirrer, a thermometer, and a reflux condenser.

The mixture was stirred at 30–40° C. for 1 hour and then refluxed for 10 hours.

During the last 5 hours of refluxing, 80 g. (2 mols) of sodium hydroxide were added in small portions.

After filtration, the solvent was distilled off.

The residue was completely dried by heating at 140–150° C. for 2 hours, under a residual pressure of 1.2 mm. Hg.

The polycondensate so obtained is a solid material, N=13.7%.

A mix was prepared from 0.300 kg. of the polycondensate prepared as described above and 5.700 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 230° C.
head of spinning device temperature: 240° C.
spinneret temperature: 230° C.
spinneret type: holes, 60; diameter, 0.8 mm.; length, 16 mm.
pressure: 53 kg./cm.$^2$
winding speed: 430 m./minute The fibers obtained, after drawing at 130° C. in a drawing device heated with steam with a drawing ratio of 1:5.3 and after being subjected to a thermal treatment, under conditions of free shrinking (110° C. for 15 minutes) for improving the dimensional stability, have the following properties:

tenacity (g./den): 5.1
elongation (percent): 20

Before drawing, the fibers were wetted with a 3% aqueous solution of ethyleneglycoldiglycidylether.

Colors having good intensity and fastness were obtained after dyeing these fibers with the dyes used in Example 1.

Example 10

112.2 g. (0.4 mol) on N,N'-dicyclohexylhexamethylenediamine, 74 g. (0.8 mol) of epichlorohydrin and 300 ml. of methanol were introduced into a 1-liter 3-necked flask, provided with a stirrer, a thermometer, and a reflux condenser.

The mass was refluxed for 6 hours. It was cooled to 20° C., and 86.1 g. (1 mol) of anhydrous piperazine, 55.5 g. (0.6 mol) of epichlorohydrin and 220 ml. of methanol were added.

The mixture was stirred at 25–35° C. for 2 hours and then refluxed for 10 hours.

During the last 5 hours of refluxing, 56 g. (1.4 mols) of sodium hydroxide were added in small portions.

After filtration, the solvent was distilled off.

The residue was completely dried by heating at 120–130° C. for 2 hours, under a residual pressure of 1–2 mm. Hg.

The polycondensate so obtained is a solid resinous material, pale-yellow colored, softening at 70–78° C., N=13.8%, inherent viscosity=0.24 (measured in 0.5% $CHCl_3$ solution at 25° C.).

A mix was prepared from 0.200 kg. of the polycondensate prepared as described above and 4.800 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 250° C.
spinneret temperature: 240° C. spinneret type: holes, 60; diameter, 0.8 mm.; length, 16 mm.
pressure: 38 kg./cm.$^2$
winding speed: 400 m./minute The fibers obtained, after drawing at 130° C. in a drawing device heated with steam, with a drawing ratio of 1:4, have the following properties:

tenacity (g./den.): 3.5
elongation (percent): 32

After drawing, the fibers were wetted with a 5% aqueous solution of ethyleneglycoldiglycidylether and then dried at 120° C.

Colors having good intensity and fastness were obtained after dyeing these fibers with the dyes used in Example 1.

Example 11

43.2 g. (0.3 mol) of N,N'-dimethylhexamethylenediamine, 86.1 g. (1 mol) of anhydrous piperazine, 120.25 g. (1.3 mols) of epichlorohydrin and 500 ml. of ethanol, were introduced into a 2-liter 3-necked flask, provided with a stirrer, a thermometer, and a reflux condenser.

The mixture was stirred at 30–40° C. for 2 hours and then refluxed for 10 hours.

During the last 4 hours of refluxing, 52 g. (1.3 mols) of sodium hydroxide were added in small portions.

After filtration, the solvent was distilled off.

The residue was completely dried by heating at 100–120° C. for 2 hours, under a residual pressure of 1–2 mm. Hg.

The polycondensate so obtained is a solid material, pale-yellow colored, softening at 48–54° C., N=17.6%, inherent viscosity=0.28 (measured in 0.5% $CHCl_3$ solution at 25° C.).

A mix was prepared from 0.150 kg. of the polycondensate prepared as described above and 4.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 230° C.
head of spinning device temperature: 230° C.
spinneret temperature: 220° C.
spinneret type: holes, 60; diameter, 0.8 mm.; length, 16 mm.
pressure: 41 kg./cm.$^2$
winding speed: 400 m./minute The fibers obtained, after drawing at 130° C. in a drawing device heated with steam, with a drawing ratio of 1:5, have the following properties:

tenacity (g./den.): 4.3
elongation (percent): 26

After drawing, the fibers were wetted with a 6% aqueous solution of ethyleneglycoldiglycidylether and then dried at 110° C.

Colors having good intensity and fastness were obtained after dyeing these fibers with the dyes used in Example 1.

Example 12

99.2 g. (0.25 mol) of N,N'-didodecylethylenediamine, 46.25 g. (0.5 mol) of epichlorohydrin and 200 ml. of methanol were introduced into a 1-liter 3-necked flask, provided with a stirrer, a thermometer, and a reflux condenser.

The mass was refluxed for 8 hours. It was cooled to 20° C., and 64.6 g. (0.75 mol) of anhydrous piperazine, 46.25 g. (0.5 mol) of epichlorohydrin and 150 ml. of methanol were added.

The mixture was refluxed for 14 hours.

During the last 6 hours of refluxing, 40 g. (1 mol) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a solid material, pale-yellow colored, softening at 45–52° C., N=12.4%, inherent viscosity=0.31 (measured in 0.5% $CHCl_3$ solution at 25° C.).

A mix was prepared from 0.150 kg. of the polycondensate prepared as described above and 4.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3%, and an ash content of 0.024%.

The mix was spun in a melt-spinning device, under the following conditions:

screw temperature: 240° C.
head of spinning device temperature: 220° C.
spinneret temperature: 220° C.
spinneret type: holes, 60; diameter, 0.8 mm.; length, 16 mm.
pressure: 43 kg./cm.$^2$
winding speed: 420 m./minute The fibers obtained, after drawing at 130° C. in a drawing device heated with steam, with a drawing ratio of 1:5, have the following properties:

tenacity (g./den.): 4.3
elongation (percent): 23

After drawing, the fibers were wetted with a 3% aqueous solution of ethyleneglycoldiglycidylether and then dried at 80° C.

Colors having good intensity and fastness were obtained upon dyeing these fibers with the dyes used in Example 1.

Example 13

70.6 g. (0.25 mol) of 4,4'-bis(ethylamine)3,3'-dimethyldiphenylmethane, 46.25 g. (0.5 mol) of epichlorohydrin and 180 ml. of methanol were introduced into a 1-liter 3-necked flask, provided with a stirrer, a thermometer, and a reflux condenser.

The mass was refluxed for 8 hours. It was cooled to 20° C. and 86.1 g. (1 mol) of anhydrous piperazine, 69.38 g. (0.75 mol) of epichlorohydrin and 230 ml. of methanol were added.

The mixture was refluxed for 14 hours.

During the last 10 hours of refluxing, 50 g. (1.25 mols) of sodium hydroxide were added in small portions.

After filtration, the solvent was distilled off.

The residue was completely dried by heating at 110–120° C. for 3 hours, under a residual pressure of 1–2 mm. Hg.

The polycondensate so obtained is a solid resinous material, yellow colored, softening at 92–103° C., N=15.1%, inherent viscosity=0.33 (measured in 0.5% $CHCl_3$ solution at 25° C.).

A mix was prepared from 0.150 kg. of the polycondensate prepared as described above and 4.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 235° C.
head of spinning device temperature: 230° C.
spinneret temperature: 220° C.
spinneret type: holes, 60; diameter, 0.8 mm.; length, 16 mm.
pressure: 49 kg./cm.$^2$
winding speed: 400 m./minute The fibers obtained, after drawing at 130° C. in a drawing device heated with hot air, with a drawing ratio of 1:5, have the following properties:

tenacity (g./den.): 4.7
elongation (percent): 24.5

After drawing, the fibers were wetted with a 6% aqueous solution of ethyleneglycoldiglycidylether and then dried at 100° C.

Colors having good intensity and fastness were obtained, after dyeing these fibers with the dyes used in Example 1.

Example 14

89.7 g. (0.4 mol) of N,N'-dicyclohexylethylenediamine, 74 g. (0.8 mol) of epichlorohydrin and 260 ml. of methanol were introduced into a 2-liter 3-necked flask, provided with a stirrer, a thermometer, and a reflux condenser.

The mass was refluxed for 2 hours. It was cooled to 20° C., and 86.1 g. (1 mol) of anhydrous piperazine, 55.5 g. (0.6 mol) of epichlorohydrin and 220 ml. of methanol were added. The mixture was refluxed for 10 hours.

During the last 6 hours of refluxing, 56 g. (1.4 mols) of sodium hydroxide were added in small portions.

After filtration, the solvent was distilled off.

The residue was completely dried by heating at 110–120° C. for 2 hours, under a residual pressure of 1–2 mm. Hg.

The polycondensate so obtained is a solid material, yellow colored, softening at 56–68° C., N=15%, inherent viscosity=0.15 (measured in 0.5% CHCl₃ solution at 25° C.).

A mix was prepared from 0.150 kg. of the polycondensate prepared as described above and 4.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 220° C.
head of spinning device temperature: 230° C.
spinneret temperature: 220° C.
spinneret type: holes, 60; diameter, 0.8 mm.; length, 16 mm.
pressure: 51 kg./cm.$^2$
winding speed: 400 m./minute The fibers obtained, after drawing at 130° C. in a drawing device heated with steam, with a drawing ratio of 1:5, have the following properties:

tenacity (g./den.); 4.8
elongation (percent): 27

After drawing, the fibers were wetted with a 6% aqueous solution of ethyleneglycoldiglycidylether and then dried at 100° C.

Colors having good intensity and fastness were obtained after dyeing these fibers with the dyes used in Example 1.

Example 15

56.1 g. (0.2 mol) of N,N'-dicyclohexylhexamethylenediamine, 37 g. (0.4 mol) of epichlorohydrin and 170 ml. of methanol were introduced into a 1-liter 3-necked flask, provided with a stirrer, a thermometer, and a reflux condenser.

The mass was refluxed for 6 hours. It was cooled to 20° C., and 88.1 g. (1 mol) of N,N'-dimethylethylenediamine, 74 g. (0.8 mol) of epichlorohydrin and 230 ml. of methanol were added.

The mixture was refluxed for 12 hours.

During the last 8 hours of refluxing, 48 g. (1.2 mols) of sodium hydroxide were added in small portions.

After filtration, the solvent was distilled off.

The residue was completely dried by heating at 110–120° C. for 2 hours, under a residual pressure of 1–2 mm. Hg.

The polycondensate so obtained is a semisolid material, N=15.6%.

A mix was prepared from 0.150 kg. of the polycondensate prepared as described above and 4.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 225° C.
head of spinning device temperature: 230° C.
spinneret temperature: 220° C.
spinneret type: holes, 60; diameter, 0.8 mm.; length, 16 mm.
pressure: 47 kg./cm.$^2$
winding speed: 400 m./minute The fibers obtained, after drawing at 130° C. in a drawing device heated with steam, with a drawing ratio of 1:5, have the following properties:

tenacity (g./den.): 4.4
elongation (percent): 24

After drawing, the fibers were wetted with a 6% aqueous solution of ethyleneglycoldiglycidylether and then dried at 110° C.

Colors having good intensity and fastness were obtained after dyeing these fibers with the dyes used in Example 1.

Example 16

180.6 g. (2.1 mols) of anhydrous piperazine, 185 g. (2 mols) of epichlorohydrin and 600 ml. of ethanol were introduced into a 2-liter 3-necked flask, provided with a stirrer, a thermometer, and a reflux condenser.

The mixture was stirred at 25–35° C. for 1.5 hours and then refluxed for 10 hours.

During the last 3 hours of refluxing, 80 g. (2 mols) of sodium hydroxide were added in small portions.

NaCl was removed by hot filtration, and the filtrate was then precipitated by pouring into acetone (1500 ml.).

The white precipitate was completely dried by heating at 100–110° C. for 2 hours, under a residual pressure of 1–2 mm. Hg.

The polycondensate so obtained is a white solid material softening at about 200° C., N=19.8%, inherent viscosity=0.36 (measured in 0.5% CHCl₃ solution, at 25° C.).

A mix was prepared from 0.240 kg. of the polycondensate prepared as described above and 5.760 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 250° C.
spinneret temperature: 250° C.
spinneret type: holes, 60; diameter, 0.8 mm.; length, 16 mm.
pressure: 60 kg./cm.$^2$
winding speed: 470 m./minute The fibers obtained, after drawing at 130° C. in a drawing device heated with steam, with a drawing ratio of 1:5.5, and after being subjected to a thermal treatment, under conditions of free shrinking (110° C. for 15 minutes) for improving the dimensional stability, have the following properties:

tenacity (g./den.): 4.7
elongation (percent): 21

After drawing and thermal stabilization, the fibers were wetted with a 5% aqueous solution of ethyleneglycoldiglycidylether and then dried at 100° C.

Colors having good intensity and fastness were obtained after dyeing these fibers with dyes used in Example 1.

Example 17

340 g. (2 mols) of 1,8-p-menthanediamine, 185 g. (2 mols) of epichlorohydrin and 600 ml. of isopropanol were introduced into a 2-liter 3-necked flask, provided with a stirrer, a thermometer, and a reflux condenser.

The mass was refluxed for 14 hours.

During the last 4 hours of refluxing, 80 g. (2 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a solid material, pale-yellow colored, softening at 85–87° C., N=12.1%, inherent viscosity=0.21 (measured in 0.5% CH₃Cl₃ solution, at 25° C.).

A mix was prepared from 0.40 kg. of the polycondensate prepared as described above and 7.600 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 230° C.
spinneret temperature: 230° C.
spinneret type: holes, 60; diameter, 0.8 mm.; length, 16 mm.
pressure: 48 kg./cm.$^2$
winding speed: 450 m./minute The fibers obtained, after drawing at 130° C. in a drawing device heated with steam, with a drawing ratio of 1:5.5, have the following properties:

tenacity (g./den.): 5.2
elongation (percent): 22

After drawing, the fibers were wetted with a 3% aqueous solution of ethyleneglycoldiglycidylether and then dried at 110–120° C.

Colors having good intensity and fastness were obtained after dyeing these fibers with the dyes used in Example 1.

Example 18

400 g. (2 mols) of N,N'-diisopropylhexamethylenediamine, 185 g. (2 mols) of epichlorohydrin and 400 ml. of isopropanol were introduced into a 2-liter 3-necked flask, provided with a stirrer, a thermometer, and a reflux condenser.

The mass was refluxed for 23 hours.

During the last 2 hours of refluxing, 80 g. (2 mols) of sodium hydroxide were added in small portions.

After filtration, the solvent was distilled off.

The residue was completely dried by heating at 140–150° C. for 2 hours, under a residual pressure of 1–2 mm. Hg.

The polycondensate so obtained is a thick and viscous liquid, N=10.7%.

A mix was prepared from 0.420 kg. of the polycondensate prepared as described above and 6.580 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 240° C.
head of spinning device temperature: 240° C.
spinneret temperature: 230° C.
spinneret type: holes, 60; diameter, 0.8 m.; length, 16 mm.
pressure: 55 kg./cm.$^2$
winding speed: 450 m./minute The fibers obtained, after drawing at 130° C. in a drawing device heated with steam, with a drawing ratio of 1:5.3, have the following properties:

tenacity (g./den.): 5.3
elongation (percent): 22

After drawing, the fibers were wetted with a 3% aqueous solution of ethyleneglycoldiglycidylether and then dried at 110° C.

Colors having good intensity and fastness were obtained after dyeing these fibers with the dyes used in Example 1.

Example 19

116.3 g. (1.02 mols) of 2,5-dimethylpiperazine-trans, 92.5 g. (1 mol) of epichlorohydrin and 500 ml. of ethanol were introduced into a 1-liter 3-necked flask, provided with a stirrer, a thermometer, and a reflux condenser. The mixture was stirred at 25–35° C. for 1 hour and then refluxed for 12 hours.

During the last 6 hours of refluxing, 40 g. (1 mol) of sodium hydroxide were added in small portions.

After filtration, the solvent was distilled off.

The residue was completely dried by heating at 120° C. for 2 hours, under a residual pressure of 1–2 mm. Hg.

The polycondensate so obtained is a solid material, softening at 175–180° C., N=16.2%, inherent viscosity=0.20 (measured in 0.5% CHCl$_3$ solution, at 25° C.).

A mix was prepared from 0.150 kg. of the polycondensate prepared as described above and 4.850 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spun in a melt-spinning device, under the following conditions:

screw temperature: 250° C.
head of spinning device temperature: 240° C.
spinneret temperature: 240° C.
spinneret type: holes, 60; diameter, 0.8 mm.; length, 16 mm.
pressure: 61 kg./cm.$^2$
winding speed: 400 m./minute The fibers obtained, after drawing at 130° C. in a drawing device heated with steam, with a drawing ratio of 1:5, have the following properties:

tenacity (g./den): 4.4
elongation (percent): 27

After drawing, the fibers were wetted with a 4% aqueous solution of ethyleneglycoldiglycidylether and than dried at 120° C.

Colors having good intensity and fastness were obtained after dyeing these fibers with the dyes used in Example 1.

Example 20

144.2 g. (1 mol) of N,N'-dimethylhexamethylenediamine, 92.5 g. (1 mol) of epichlorohydrin and 650 ml. of ethanol were introduced into a 2-liter 3-necked flask, provided with a stirrer, a thermometer, and a reflux condenser.

The mixture was stirred at 20–30° C. for 1 hour and then refluxed for 14 hours.

During the last 8 hours of refluxing, 40 g. (1 mol) of sodium hydroxide were added in small portions.

After filtration, the solvent was distilled off.

The residue was completely dried by heating at 140° C. for 2 hours, under a residual pressure of 1–2 mm. Hg.

The polycondensate so obtained is a semisolid material, yellow colored, N=13.6%.

A mix was prepared from 0.200 kg. of the polycondensate prepared as described above and 4.800 kg. of polypropylene obtained with the aid of a stereospecific catalyst (see for example Italian Pat. 526,101) and having an intrinsic viscosity (measured in tetrahydronaphthalene at 135° C.) of 1.37, a residue after n-heptane extraction of 96.3% and an ash content of 0.024%.

The mix was spn in a melt-spinning device, under the following conditions:

screw temperature: 240° C.
head of spinning device temperature: 220° C.
spinneret temperature: 220° C.
spinneret type: holes, 60; diameter, 0.8 mm.; length, 16 mm.
pressure: 51 kg./cm.$^2$
winding speed: 420 m./minute The fibers obtained, after drawing at 130° C. in a drawing device heated with steam, with a drawing ratio of 1:5, have the following properties:

tenacity (g./den.): 3.5
elongation (percent): 21

After drawing, the fibers were wetted with a 4% aqueous solution of ethyleneglycoldiglycidylether and then dried at 60° C.

Colors having good intensity and fastness were obtained after dyeing these fibers with the dyes used in Example 1.

The intrinsic viscosities of the polypropylene, where not otherwise indicated, were measured in tetrahydronaphthalene at 135° C.

As primary or secondary aliphatic amines suitable for use in the present invention, $C_3$–$C_{30}$ primary amines and $C_4$–$C_{60}$ secondary amines are especially suitable.

Many variations and modifications can, of course, be practiced without departing from the spirit and scope of the present invention.

Having thus described our invention, what we desire to secure by Letters Patent and hereby claim is:

1. A basic nitrogen-containing compound obtained by either (A) reacting epichlorohydrin with:
   (A₁) two disecondary $C_4$–$C_{60}$ aliphatic, aromatic or heterocyclic amines selected from the group consisting of diamines containing secondary amine groups and diamines containing primary amine groups bound to tertiary carbon atoms and which act as secondary amine groups due to steric hindrance; or
   (A₂) one disecondary diamine according to (A₁) and one $C_3$–$C_{30}$ primary aliphatic amine; or
(B) reacting epichlorohydrin with a disecondary aliphatic, aromatic or heterocyclic $C_4$–$C_{60}$ diamine or a diamine containing primary amine groups bound to tertiary carbon atoms and which act as secondary amine groups due to steric hindrance.

2. The compound of claim 1, wherein the proportions of reactants of said reaction (A) is:
   (A₁) 1 mol of epichlorohydrin to from 0.9 to 1.1 mols of total disecondary amines selected from the group consisting of aliphatic, aromatic and heterocyclic disecondary diamines and of diamines containing primary amine groups bound to tertiary carbon atoms and which act as secondary amine groups due to steric hindrance; or
   (A₂) 1 mol of epichlorohydrin to from 0.9 to 1.1 mols of total primary aliphatic acine and disecondary diamine.

3. The compound of claim 1 wherein the proportion of reactants of said reaction (B) is 1 mol of epichlorohydrin to from 0.9 to 1.1 mols of said disecondary diamine.

4. The compound of claim 1 which is produced by a reaction which is carried out in two stages, a first stage wherein the epichlorohydrin is reacted with the primary aliphatic amine to form a reaction product, and a second stage wherein additional epichlorohydrin is reacted with the first stage reaction product and with the disecondary diamine.

References Cited
UNITED STATES PATENTS

| | | | |
|---|---|---|---|
| 2,849,411 | 8/1958 | Lehmann et al. | 260—29.2 |
| 3,031,504 | 4/1962 | Pollitzer | 260—584 |
| 3,031,505 | 4/1962 | Pollitzer | 260—584 |
| 3,497,556 | 2/1970 | Lanner et al. | 260—584 |

FOREIGN PATENTS

| | | |
|---|---|---|
| 869,073 | 3/1953 | Germany. |

WILLIAM H. SHORT, Primary Examiner

L. A. NIELSEN, Assistant Examiner

U.S. Cl. X.R.

8—180; 260—29.2 EP, 584 R